Nov. 16, 1943.  A. KOK  2,334,416
FRUIT SLICING APPARATUS
Filed Oct. 8, 1941  2 Sheets-Sheet 1
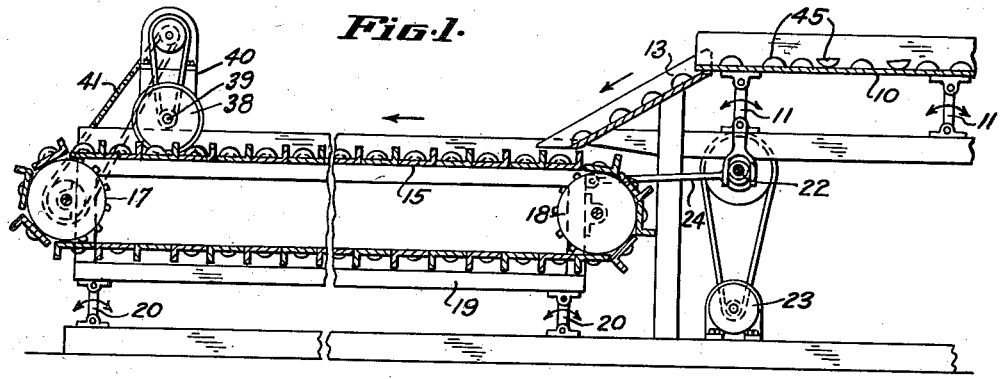
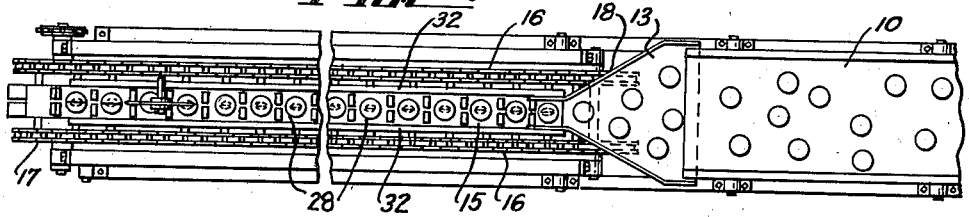
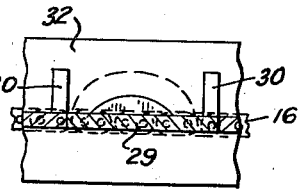
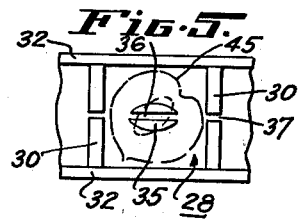
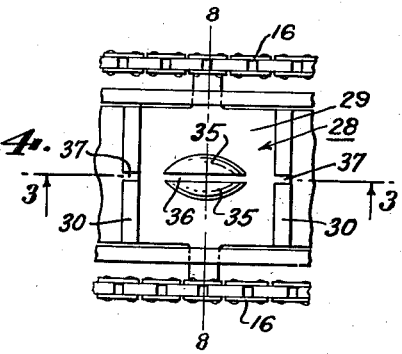
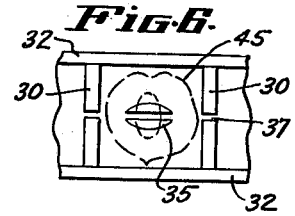
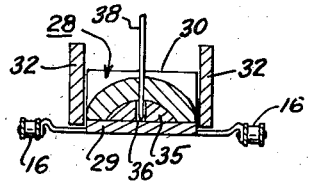
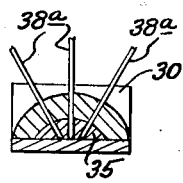
INVENTOR.
ALBERT KOK
BY
Naylor and Larragne
ATTORNEYS.

Nov. 16, 1943.  A. KOK  2,334,416
FRUIT SLICING APPARATUS
Filed Oct. 8, 1941  2 Sheets-Sheet 2

INVENTOR.
ALBERT KOK
BY
ATTORNEYS

Patented Nov. 16, 1943

2,334,416

UNITED STATES PATENT OFFICE 2,334,416

FRUIT SLICING APPARATUS

Albert Kok, Menlo Park, Calif.

Application October 8, 1941, Serial No. 414,067

5 Claims. (Cl. 146—73)

This invention relates to a fruit-slicing apparatus of a character suitable for quartering and slicing fruit following preliminary treatment in which the fruit has been halved and the pits or cores thereof removed by some known or conventional means.

The invention is particularly adapted for use in quartering or slicing the well-known cling peach although the principle involved will be found useful with or without modification in reducing other fruit to quarters or slices. For instance, the apparatus has been found useful in quartering apples.

It is familiar practice in canning art to halve and remove the pits of cling peaches by certain well-known or conventional apparatus. The pitting operation usually follows preliminary treatment to remove the fruit skins. It is also well-known that the cling peach is possessed of an extremely firm texture before being subjected to the canning process and additionally the pit cavity resulting from the pitting operation is uniformly well defined.

The generally accepted practice of reducing the halved peaches into quarters is a completely manual operation. That is to say, the operator cuts the halves with a hand knife from stem end to apex. While, as may be expected, the avertge operator attains a high degree of efficiency, nevertheless there is a pronounced need for mechanical means which will accomplish this same result, thereby reducing the cost of this particular detail of plant practice and at the same time attain a satisfactory degree of uniformity in the appearance of the fruit.

The present invention contemplates the use of the well defined pit cavity in cling peaches as an incident to aligning the fruit halves for the subsequent cutting operation to reduce the fruit into quarter size. In terms of general inclusion these objects are attained by the provision of an apparatus to receive the fruit halves indiscriminately and without regard to alignment of the fruit and which will then act upon the pit cavity of the fruit to properly align it for the subsequent cutting operation.

These and other objects of the invention are attained by provision of the means shown in the accompanying drawings in which:

Figure 1 is a vertical longitudinal section taken through an apparatus embodying the principles of this invention;

Figure 2 is a plan view of the apparatus;

Figure 3 is a sectional view along the lines 3—3 of Figure 4;

Figure 4 is a plan view of one of the fruit receiving compartments;

Figure 10:
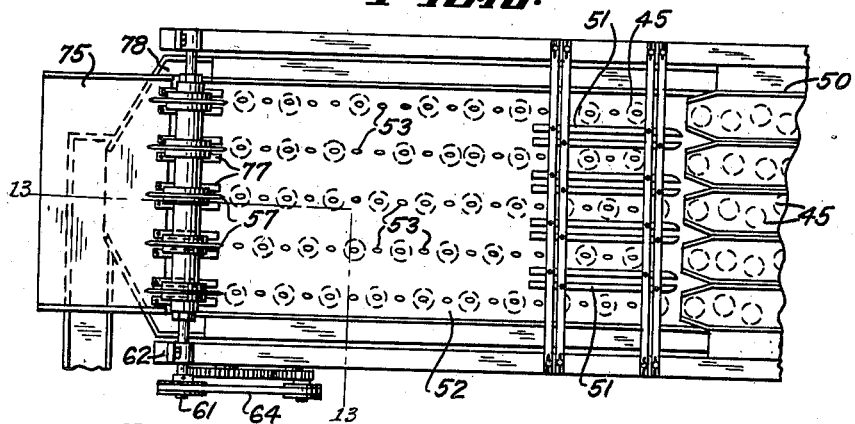
Figure 11:
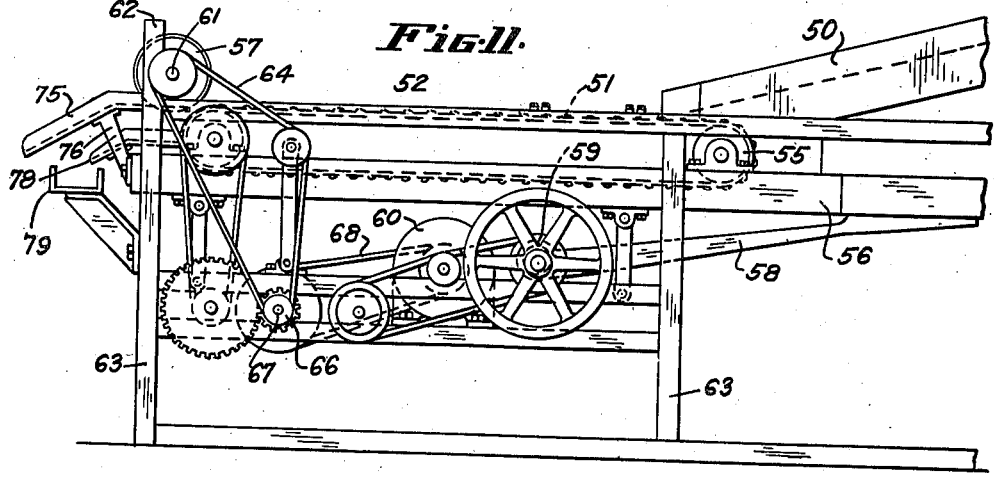
Figure 12:
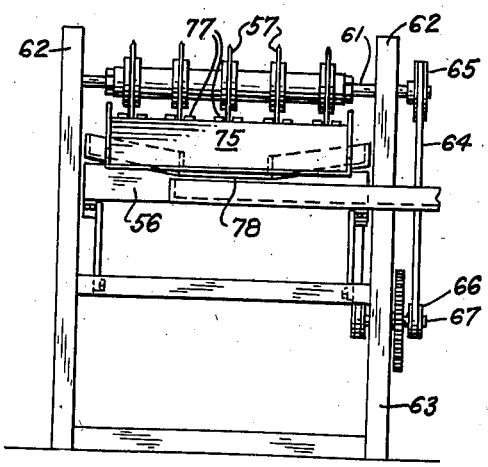

Figures 5, 6, and 7 are sequential plan views illustrating the shifting of the fruit halves in the alignment thereof;

Figure 8 is a vertical section along the line 8—8 of Figure 4;

Figure 9 is a modification of the invention useful in slicing the fruit into smaller than quarter segments;

Figure 10 is a top plan view of a modified form of the fruit aligning and cutting apparatus;

Figure 11 is a side elevational view of the apparatus of Figure 10;

Figure 12 is an end elevational view of the apparatus of Figure 10; and

Figure 13:
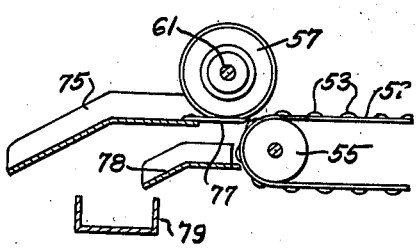

Figure 13 is a vertical sectional view taken along the line 13—13 of Figure 10.

In order to utilize the well-defined pit cavity of a cling peach half for purposes of alignment for further cutting, it is first essential that the fruit sections be delivered to the alignment and cutting means in inverted position, that is to say, with their cut faces down. To accomplish this result it has been found expedient to employ an orienting device, one form of which is illustrated in Figures 1 and 2 of the accompanying drawings. This turn-over means consists in a shaker table 10 supported on the pivotally connected legs 11 for reciprocal horizontal shaking movement obtained in any known way such as an operative connection with eccentric 22. It is well-known that, when fruit halves are introduced upon such a means indiscriminately, the fruit will, upon actuation of the shaker means, be rocked to the extent of being flipped over or inverted with their cut faces extending downwardly. Additionally, the fruit will be caused to progress over the surface of the shaker table 10 toward its discharge end. Here delivery of the thus inverted fruit halves to the aligning means is accomplished by means of the inclined, downwardly converging chute 13.

The apparatus of this invention receives the fruit halves in this inverted position indiscriminately with respect to the alignment of the pit cavities longitudinally of the machine for the cutting operation. There is provided an endless conveyor means, generally designated by the numeral 15, driven by the chains 16 passing over the sprockets 17 and 18 suitably journaled at opposite ends of a frame 19. The frame 19 is supported on the legs 20 for horizontal shaking motion and such motion is imparted to the frame 19 and the members carried thereby by means of an eccentric 22 driven by a motor 23, there being an operative connection between frame 19 and eccentric 22 in the form of a conventional pitman rod 24.

Fruit compartments 28 to receive the fruit halves discharged from the chute 13 are defined by successive links carried between the chains 16. One form which these elements may take is illustrated in Figures 3 and 4 wherein there is shown a plate member 29 having arms projecting laterally therefrom for suitable connection to the side chains 16. At one end of each of the plates 29 there is disposed a partition member 30, which may be formed by simply bending an end of the plate 29 upwardly at right angles or by affixing thereon a separate, vertically disposed piece. An endless member formed of a plurality of such plates 29 will be divided transversely at regularly spaced intervals with the partition 30 on one plate 29 defining the forward end partition of the compartment and the partition 30 on the next succeeding plate defining the rear end partition for that particular compartment. In this manner there is formed an end-to-end chain of fruit receptacles 28, such as that shown in Figures 1 and 2.

While it is to be appreciated that the apparatus can be so constructed that each compartment 28 consists in a rectangular-shaped box built onto the plate 29, without departing from the spirit of this invention, nevertheless, I have chosen to employ the longitudinally extending guide bars 32 on the frame 19 as the side walls of the compartments 28. This practice will serve the added purpose of doubly insuring proper alignment of the compartments 28 and hence the fruit halves contained therein.

Fruit cavity seats 35 are secured to the plates 29 and are so arranged thereon as to be medially disposed within the compartments 28. These pit seats 35 are ovate in shape and their longitudinal axes are aligned parallel to the guide bars 32. Each seat 35 is provided with a knife receiving slot 36 disposed longitudinally of the conveyor 15. Likewise the partition members 30 are slotted as at 37 to receive the cutting edge of knife 38 in the movement of conveyor 15 thereunder.

The knife 38 is preferably of the rotary type supported on a shaft 39 journaled in an auxiliary frame 40. It may be driven by any source of power, but is here shown as being turned by the chain drive 41 having an operative connection with the shaft of conveyor sprocket 17.

It will thus be seen that, when fruit halves 45 are delivered in inverted position to the machine forming the subject matter hereof by the chute 13, they will fall into the compartments 28. In some instances, their longitudinal axes will be properly aligned, and the pit cavity will fit neatly on the cavity seat 35 (see Figure 7) in readiness for the subsequent quartering action of the knife 38, but in a great many instances the cavities will be disposed at an angle to seats 35 and must be rearranged or shifted. Examples of such irregular disposition of the fruit halves are illustrated in Figures 5 and 6 of the drawings.

Reciprocal agitation of the conveyor mechanism 15, provided by the pitman 24, will cause repeated shifting of the fruit halves with respect to the seats 35 and, during the course of travel of the conveyor 15, the fruit will reach proper alignment and settle at the lowest possible point in the compartment, namely, with its cavity on the seat 35 (see Figure 7).

As the loaded fruit compartments 28 progress forwardly with the conveyor 15, the fruit is moved under the knife 38, the cutting edge of which passes through the slots 36 in the seats 35 and slots 37 in the partition members 30 (see Figure 8) passing through the fruit and thereby effecting a quartering of the fruit halves. When thus quartered, the fruit is discharged from the compartments 28 into any sort of receptacle or onto a conveyor (not shown) for transportation to the means whereby the next step in the canning process will be completed.

In Figure 9 there is illustrated an arrangement whereby the fruit halves may be reduced to a plurality of slices as distinguished from mere quartering. Here a plurality of knives 38a are arranged at different angles and extend downwardly through appropriate slots in the partition members 30 into seats 35 to cut the fruit halves into four slices instead of quarters, as in the preferred form of the invention.

While I have shown the fruit-slicing apparatus in Figures 1 and 2 as being capable of handling but a single line of fruit sections, use of the invention in a multiple-line apparatus is contemplated. Such a multiple-line device is illustrated in Figures 10 to 12, inclusive, embodying some modification of the structure heretofore described. In this modified form, a plurality of lines of fruit sections 45 are received in inverted position from a suitable orienting or turn-over device (not shown) moving downwardly therefrom through chutes 50. Each line of fruit passes between a pair of adjustable guide members 51 extending longitudinally of the conveyor belt 52, being thereby held in proper alignment for engagement of the fruit cavities by the seats 53 arranged in longitudinally extending, spaced-apart rows on conveyor 52. Here the endless conveyor passes over a pair of pulleys 55 suitably journaled in a shaker bed 56 rockably supported on frame 63.

It will be understood that, as the fruit halves 45 are delivered down the chute 50 to the conveyor belt 52, only a few of them will have their longitudinal axes disposed longitudinally of the conveyor 52 or in alignment for subsequent proper quartering by the knives 57. Therefore, when the cavities of the fruit are engaged by the seats 53, agitation of the fruit will be required to properly seat the fruit as indicated in Figure 7 herein. In this modified form of the invention, this agitation is provided by means of a pitman 58 attached to shaker bed 56 and having a suitable connection with an eccentric 59 and a driven connection with a prime mover such as the motor 60. The reciprocal vibratory motion produced by the pitman 58 is transmitted through the frame 56 and thence to the conveyor belt 52, and as a result thereof the fruit sections 45 are caused to be repeatedly shifted during the course of forward movement of the belt until such time as the longitudinal axes of the fruit are in alignment for proper cutting or, in other words, until the fruit is properly settled on the seats 53.

In this particular form of the invention, it will be understood that the fruit seats 53 are solid pieces and not slotted as in the case of the seats 35, as the quartering of the fruit takes place beyond the end of conveyor belt 52 (see Figures 11 and 13) and hence out of the path of the seats 53. A plurality of the knives 57, one for each row of seats 53 and spaced accordingly, are mounted on a common shaft 61 suitably journaled on the extensions 62 of the main frame 63. The knives 57 are adapted to be rotated in any conventional way such as by means of a belt 64 passing over pulley 65 on shaft 61 and having a driven connection with motor 60 through the medium of pulley 66 on shaft 67 and belt 68.

A discharge chute 75 is provided for the fruit cut by the knives 57, being supported on the shaker bed 56 in any conventional way, such as by the brackets 76. Projecting inwardly from the receiving edge of the discharge chute and longitudinally of the machine, I provide a plurality of fingers 77. These fingers are arranged one on either side of each knife 57 to define a knife receiving slot and a skidway for the fruit sections being cut thereby. As shown in Figure 13, the forward ends of the fingers, like the forward edges of the knives 57, are set to barely clear the fruit seats 53 carried by the belt 52.

In the construction just described, fruit halves properly aligned on the seats 53 (as illustrated in dotted lines in Figure 10) are conveyed to the forward cutting edge of the knives 57. The combined bite of the knives 57 and the thrust imparted to the fruit sections as they move from the belt 52 onto the fingers 77 serves to carry them completely through the cutting operation and over the fingers into the discharge chute 75 from whence they are transported for such further processing as may be desired.

Provision has been made to by-pass improperly formed fruit sections as well as those fruit halves which carry a split pit resulting from imperfect treatment by the pitting and halving means. In the first place, only perfect half sections of fruit are capable of being positioned on the fruit seats 53 on belt 52, because portions over or under half sections do not have the balance required to engage a fruit seat 53 and find position thereon during the shaking of the belt. Secondly, fruit sections having a half-pit therein do not have a cavity to engage a fruit seat 53. Such fruit sections are automatically rejected by the fruit seats 53 and the shaking motion of the belt causes them to move laterally between the rows of seats 53 at which point they remain during travel on belt 52, being eventually discharged between the knives 57 and opposite pairs of fingers associated with each knife. A lower discharge chute 78, supported on shaker bed 56 beneath main discharge chute 75 catches such rejected fruit sections and delivers them to a laterally disposed chute 79 for such disposition of them as may be desired.

Thus it will be seen that in addition to uniformly aligning and quartering of the fruit sections, the machine forming the subject matter hereof also serves as an efficient sorting means to exclude from the final product undesirable and irregular fruit portions.

The invention forming the subject matter hereof is useful in speeding up the quartering of fruit sections over known methods and apparatus and, additionally, produces a wholly uniform product which was not heretofore thought possible through mechanical means.

While I have shown and described two forms which the invention may take, this must be taken for purposes of illustration only as the invention may assume other forms within the scope of the appended claims.

References herein to peach halves must be taken as an example only since the apparatus will be useful in treating sections of other varieties of pit or core containing fruits such as apricots, apples, pears, and the like.

The invention claimed is:

1. A device for reducing fruit sections having a pit or core cavity therein, comprising an endless conveyor, a line of projections on the conveyor of substantially the configuration of the fruit cavities, means defining a compartment about each projection, means for delivering inverted fruit sections to the compartments, means for imparting a shaker motion to the endless conveyor to settle the fruit sections on the projections and means for cutting the fruit while it is so settled on the said projections.

2. A device for reducing fruit sections having a pit or core cavity therein, comprising an endless conveyor, a plurality of spaced apart lines of projections of substantially the configuration of the fruit cavities, extending longitudinally of the conveyor, means for delivering fruit sections in alignment for engagement of the fruit cavities with the projections on the conveyor, means for imparting a shaker motion to the endless conveyor, and means for cutting the fruit as it leaves the projections on the conveyor.

3. A device for reducing fruit sections having a pit or core cavity therein, comprising an endless conveyor, a plurality of spaced apart lines of projections of substantially the configuration of the fruit cavities, extending longitudinally of the conveyor, means for delivering fruit sections in alignment for engagement of the fruit cavities with the lines of projections, means for imparting a shaker motion to the endless conveyor to settle the fruit sections on the projections carried thereby, means for cutting the fruit as it leaves the projections on the conveyor, and means for causing fruit sections not settled on said projections to by-pass the cutting means.

4. A device for reducing fruit sections having a pit or core cavity therein, comprising a shaker bed, a supporting frame therefor, means for imparting motion to the shaker bed, an endless conveyor on the shaker bed, a plurality of spaced apart lines of projections of substantially the configuration of the fruit cavities, extending longitudinally of the conveyor, a plurality of knives disposed at the discharge end of the endless conveyor each aligned with a line of projections and a fruit skidway arranged under each knife.

5. A device for reducing fruit sections having a pit or core cavity therein, comprising a shaker bed, a supporting frame therefor, means for imparting motion to the shaker bed, an endless conveyor on the shaker bed, a plurality of spaced apart lines of projections of substantially the configuration of the fruit cavities, extending longitudinally of the conveyor, a plurality of knives disposed at the discharge end of the endless conveyor each aligned with a line of projections, a fruit skidway under each knife, a discharge chute for the fruit sections acted upon by the knives and passing over the skidway, and a discharge chute for fruit sections not affected by the knives and falling between the skidways.

ALBERT KOK.